United States Patent
Ko

(10) Patent No.: US 10,246,123 B2
(45) Date of Patent: Apr. 2, 2019

(54) STEERING CONTROL APPARATUS AND STEERING CONTROL METHOD

(71) Applicant: MANDO CORPORATION, Pyeongtaek-si, Gyeonggi-do (KR)

(72) Inventor: Sang Jin Ko, Daejeon (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 183 days.

(21) Appl. No.: 15/372,394

(22) Filed: Dec. 8, 2016

(65) Prior Publication Data

US 2017/0166244 A1 Jun. 15, 2017

(30) Foreign Application Priority Data

Dec. 10, 2015 (KR) .................. 10-2015-0176295

(51) Int. Cl.
*B62D 5/04* (2006.01)
*B62D 15/02* (2006.01)

(52) U.S. Cl.
CPC ......... *B62D 5/0463* (2013.01); *B62D 5/0472* (2013.01); *B62D 15/021* (2013.01)

(58) Field of Classification Search
USPC ......................................................... 701/41
See application file for complete search history.

(56) References Cited

U.S. PATENT DOCUMENTS

| | | | | |
|---|---|---|---|---|
| 6,314,342 B1* | 11/2001 | Kramer | ............. | B60G 17/0195 180/197 |
| 2002/0022916 A1* | 2/2002 | Akita | .................... | B62D 7/159 701/42 |
| 2008/0007251 A1* | 1/2008 | Lee | ......................... | B62D 6/10 324/207.17 |
| 2008/0167780 A1* | 7/2008 | Suzuki | ................ | B62D 5/0466 701/42 |
| 2008/0243329 A1* | 10/2008 | Hamel | ................ | B62D 5/0472 701/31.4 |
| 2008/0277192 A1* | 11/2008 | Nishimura | ........... | B62D 5/0463 180/444 |
| 2015/0019082 A1* | 1/2015 | Inoue | .................... | B62D 1/286 701/41 |

(Continued)

OTHER PUBLICATIONS

English translation of JP,2004-161073,A to Koyo et al. (2004) (downloaded Aug. 6, 2018).*

*Primary Examiner* — Jean Paul Cass
(74) *Attorney, Agent, or Firm* — Hauptman Ham, LLP

(57) ABSTRACT

The present disclosure relates to a steering control apparatus comprising: a first sensing unit that senses a steering torque using a torque sensor; a high frequency output unit that inputs a steering torque to a high pass filter and output high frequency steering torques; a detection unit that detects a first frequency corresponding to a maximum steering torque among the high frequency steering torques; a calculation unit that calculates a high frequency steering torque change rate which is the rate of change in the high frequency steering torques; a band frequency output unit that inputs the high frequency steering torque change rate to a band pass filter that passes a first frequency band including the first frequency, to output a first frequency band steering torque change rate; and a compensation unit that compensates an assist current of a steering motor on the basis of a rejection gain.

9 Claims, 10 Drawing Sheets

(56) References Cited

U.S. PATENT DOCUMENTS

| | | | |
|---|---|---|---|
| 2015/0066302 A1* | 3/2015 | Yang | B62D 5/0472 |
| | | | 701/42 |
| 2017/0057540 A1* | 3/2017 | Anma | B62D 6/003 |
| 2017/0217477 A1* | 8/2017 | Akatsuka | B62D 5/0463 |
| 2017/0217484 A1* | 8/2017 | Toda | B62D 6/00 |
| 2017/0369092 A1* | 12/2017 | Iida | H02P 6/182 |

\* cited by examiner

STEERING CONTROL APPARATUS AND STEERING CONTROL METHOD

CROSS-REFERENCE TO RELATED APPLICATION

This application claims priority from Korean Patent Application No. 10-2015-0176295, filed on Dec. 10, 2015, which is hereby incorporated by reference for all purposes as if fully set forth herein.

BACKGROUND OF THE INVENTION

1. Field of the Invention

The present invention relates to a steering control technology.

2. Description of the Prior Art

In general, a steering apparatus of a vehicle is an apparatus for changing the direction along which a vehicle moves according to a driver's intention, and is an apparatus for helping a driver to move the vehicle in a direction desired by a driver by arbitrarily changing a rotation center about which the front wheel or wheels of the vehicle turn.

On the other hand, when the driver operates a steering wheel (steering gear) of the vehicle, the steering control apparatus assists the driver's steering wheel operating forces by using a steering motor so that the driver can easily change the direction along which the vehicle moves by using a small force.

The steering control apparatus described above is largely divided into a hydraulic steering control apparatus and an electronic steering control apparatus.

In the hydraulic steering control apparatus, when a hydraulic pump connected to a rotating shaft of an engine supplies a hydraulic fluid to a working cylinder connected to a rack bar, the piston of the working cylinder supplied with the hydraulic oil moves so as to assist the steering wheel operating forces, thereby allowing the driver to perform a steering operation with a small force.

On the other hand, since the electronic steering control apparatus includes a steering motor and an Electronic Control Unit (ECU) provided in a rack bar or a column instead of the hydraulic pump and working cylinder, the motor power can assist the operating force.

More specifically, the electronic steering control apparatus applies, to the steering motor, an assist current generated based on a steering torque generated by the steering wheel (steering gear) operated by the driver, so as to assist the steering operation force.

However, in an actual operation of the electronic steering control apparatus, an assist current is generated due to the steering torque (disturbance) generated in an external environment as well as the steering torque generated by the steering wheel (steering gear), then the assist current is applied to the steering motor.

Therefore, there is a problem in that unnecessary vibration may occur in the steering wheel (steering gear) due to the disturbance in the external environment.

SUMMARY OF THE INVENTION

In this background, an aspect of the present invention is to provide a steering control technology that can eliminate wheel vibration occurring in a steering wheel (steering gear).

According to an aspect of the present invention, a steering control apparatus is provided. The steering control apparatus includes: a first sensing unit configured to sense a steering torque using a torque sensor; a high frequency output unit configured to input a steering torque to a high pass filter and output high frequency steering torques in which low frequency steering torques are eliminated; a detection unit configured to detect a first frequency corresponding to a maximum steering torque among the high frequency steering torques; a calculation unit configured to calculate a high frequency steering torque change rate, which is the rate of change in the high frequency steering torques; a band frequency output unit configured to input the high frequency steering torque change rate to a band pass filter that passes a first frequency band including the first frequency, so as to output a first frequency band steering torque change rate; and a compensation unit configured to compensate an assist current of a steering motor on the basis of a rejection gain corresponding to the first frequency and the first frequency band steering torque change rate.

According to another aspect of the present invention, a steering control method is provided. The steering control method includes: sensing a steering torque using a torque sensor; inputting a steering torque to a high pass filter and outputting high frequency steering torques in which low frequency steering torques are eliminated; detecting a first frequency corresponding to a maximum steering torque among the high frequency steering torques; calculating a high frequency steering torque change rate, which is the rate of change in the high frequency steering torques; inputting the high frequency steering torque change rate to a band pass filter that passes a first frequency band including the first frequency, so as to output a first frequency band steering torque change rate; and compensating an assist current of a steering motor on the basis of a rejection gain corresponding to the first frequency and the first frequency band steering torque change rate.

According to the present invention described above, a steering control technology capable of eliminating vibrations occurring in the steering wheel (steering gear) can be provided.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
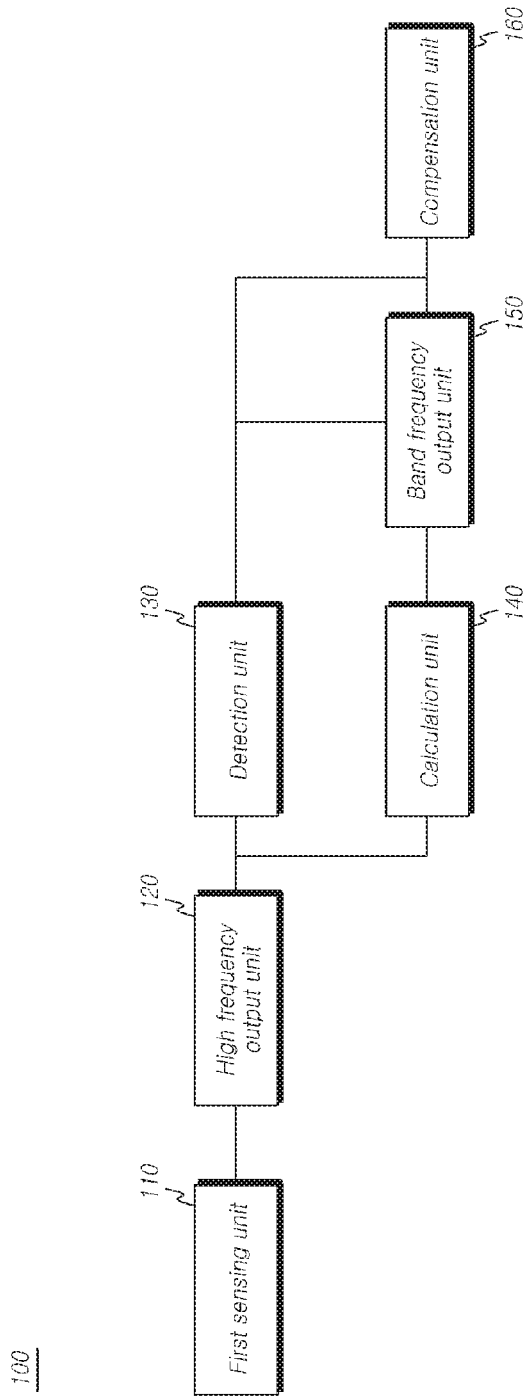
FIG. 1 is a diagram showing a configuration of a steering control apparatus according to a first embodiment of the present invention.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may be connected to", "be coupled to", or "be in contact with" the structural elements as well as that the certain structural element is directly connected to or is in direct contact with another structural element.

FIG. 1 is a diagram showing a configuration of a steering control apparatus according to a first embodiment of the present invention.

Referring to FIG. 1, a steering control apparatus 100 according to a first embodiment of the present invention may include a first sensing unit 110 for sensing a steering torque using a torque sensor, a high frequency output unit 120 for inputting a steering torque to a high pass filter and outputting high frequency steering torques in which low frequency steering torques are eliminated, a detection unit 130 for detecting a first frequency corresponding to a maximum steering torque among the high frequency steering torques, a calculation unit 140 for calculating a high frequency steering torque change rate which is the rate of change in the high frequency steering torques, a band frequency output unit 150 for inputting the high frequency steering torque change rate to a band pass filter that passes a first frequency band including the first frequency, and outputting a first frequency band steering torque change rate, and a compensation unit 160 for compensating an assist current of a steering motor on the basis of a rejection gain corresponding to the first frequency and the first frequency band steering torque change rate.

The first sensing unit 110 may sense the steering torque using a torque sensor, but is not limited thereto. That is, the first sensing unit 110 may sense a factor other than the steering torque using a sensor other than the torque sensor, and may calculate the steering torque based on a mechanism relationship or a mathematical relationship with the sensed factor.

The high frequency output unit 120 may block a frequency component less than a predetermined cut-off frequency, and input the steering torque value sensed by the first sensing unit 110 to the high pass filter, which passes a frequency component equal to or higher than the predetermined cut-off frequency, so as to output the high frequency steering torque.

That is, the frequency component of the high frequency steering torque may be equal to or higher than the cut-off frequency set in the high pass filter.

The cut-off frequency set in the high pass filter may be a frequency which can block the steering torque generated according to the driver operating the steering gear, and may be calculated based on data on the frequency of the steering torque generated according to the driver operating the steering gear.

The detection unit 130 may detect a first frequency corresponding to the maximum steering torque among the high frequency steering torques output from the high frequency output unit 120.

For example, the detection unit 130 may detect the first frequency corresponding to the maximum steering torque among the input high frequency steering torques by using a frequency detector including an active notch filter.

For example, when a high frequency steering torque is input to the active notch filter, the dominant frequency can be output as the first frequency. The dominant frequency may correspond semantically to a frequency corresponding to a larger energy value among steering torque energies obtained by performing a Fast Fourier Transform (FFT) for the input steering torque.

The calculating unit 140 may calculate the high frequency steering torque change rate by differentiating the high frequency steering torque output from the high frequency output unit 120 with respect to time and multiplying the same with a constant.

The constant may be calculated through experimental data or determined by tuning the same through experimentation.

The band frequency output unit 150 may input the high frequency steering torque change rate, which is calculated by the calculation unit 140, to a band pass filter that passes a first frequency band including the first frequency output from the detection unit 130, so as to output a first frequency band steering torque change rate.

For example, the band pass filter may include a control terminal to which the first frequency is input. The band pass filter may have, as a pass band, a first frequency band including the first frequency input through the control terminal.

More specifically, the first frequency band may be a band which ranges from a frequency obtained by adding a negative margin to the first frequency received through the control terminal, to a frequency obtained by adding a positive margin to the first frequency. The positive margin and the negative margin may be previously set.

The first frequency band steering torque change rate may be a steering torque change rate included in the first frequency band which ranges from the frequency obtained by adding a negative margin to the first frequency to the frequency obtained by adding a positive margin to the first frequency.

The compensation unit 160 may compensate an assist current of a steering motor on the basis of a rejection gain corresponding to the first frequency and the first frequency band steering torque change rate output from the band frequency output unit 150.

The rejection gain is a value that determines a disturbance cancellation rate according to a frequency. When a frequency has a value corresponding to a first frequency threshold value, the rejection gain may be defined as a value of "1", when the frequency has a value exceeding the first frequency threshold value and being equal to or smaller than a second frequency threshold value, the rejection gain may be defined as a value between "1" and "0" and inversely proportional to the frequency, and when the frequency has a value exceeding the second frequency threshold value, the rejection gain may be defined as a value of "0".

The first frequency threshold value and the second frequency threshold value may be appropriately selected according to the degree of disturbance or the type thereof, and can be set in advance in a table form or can be calculated through experimentation.

Accordingly, when the first frequency detected by the detection unit 130 is smaller than or equal to the first frequency threshold value, the rejection gain becomes "1", so that the compensation unit 160 may largely compensate for the disturbance included in the steering torque detected by the first sensing unit 110. On the other hand, when the first frequency detected by the detection unit 130 is equal to or greater than the second frequency threshold value, the rejection gain becomes "0", so that the compensation unit 160 may maintain the disturbance included in the steering torque detected by the first sensing unit 110.

In the above description, the meaning of "the compensation unit 160 maintains the disturbance" may mean that the disturbance included in the steering torque detected by the first sensing unit 110 is small so that the vibration may not occur in the steering operation device, thus the compensation reflected with the disturbance is not performed, as a result of which, the disturbance is maintained.

In addition, when the first frequency detected by the detection unit 130 has a value between the first frequency threshold value and the second frequency threshold value, the rejection gain has a value between 0 and 1 and is inversely proportional to the first frequency, so that it is controlled in such a way that the magnitude of the first frequency and the degree of the disturbance compensation are inversely proportional to each other.

According to the steering control apparatus 100 according to the first embodiment of the present invention described above, the steering torque (which corresponds to the disturbance) generated due to external factors, other than the steering torque generated by the steering apparatus operated by the driver, can be cancelled so as to eliminate the vibration occurring in the steering gear.

Figure 2:
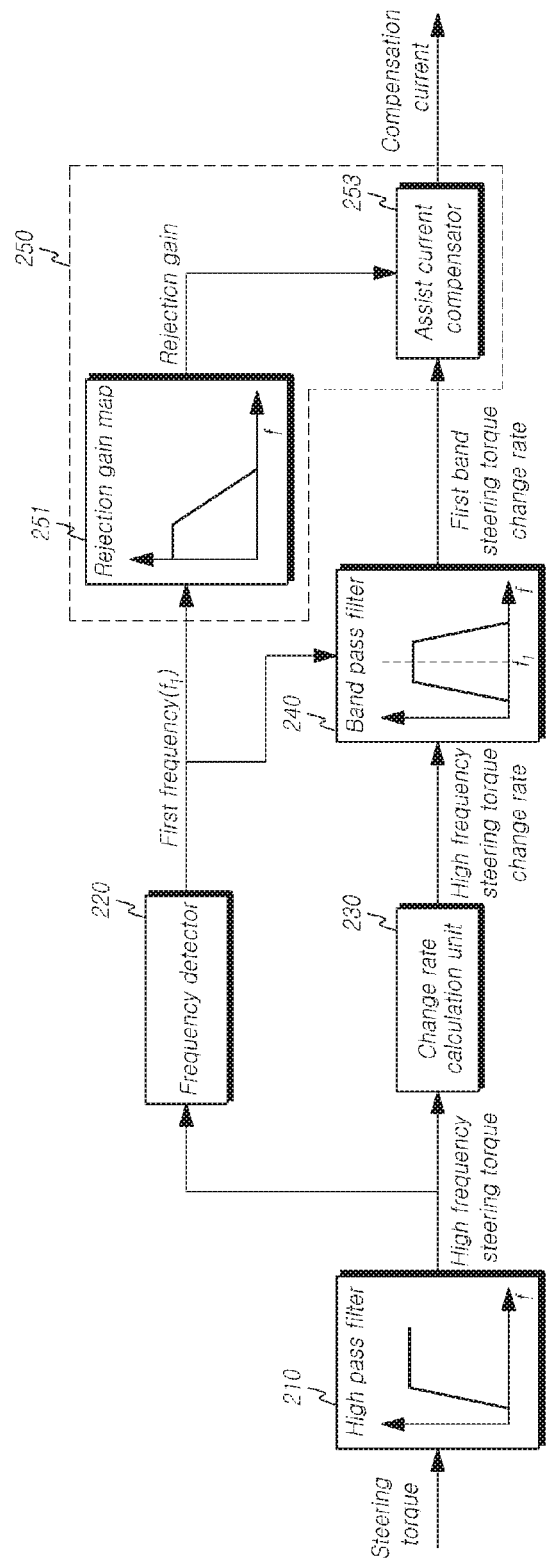
FIG. 2 is a diagram showing an example of describing an operation of the steering control apparatus according to a first embodiment of the present invention.

FIG. 2 is a diagram showing an example of describing an operation of a steering control apparatus according to a first embodiment of the present invention.

Referring to FIG. 2, a high frequency output unit of the steering control apparatus according to a first embodiment of the present invention may input the steering torque sensed by the first sensing unit to a high pass filter 210 and output a high frequency steering torque in which a low frequency steering torque is eliminated.

The steering torque sensed by the first sensing unit may refer to a steering torque for frequencies of an entire region. The low frequency steering torque may refer to a steering torque for a frequency less than the cut-off frequency set in the high pass filter 210. Alternatively, the high frequency steering torque may refer to a steering torque for a frequency equal to or higher than the cut-off frequency.

In the above operation, the cut-off frequency set in the high pass filter 210 may be a frequency which can block the steering torque generated according to the driver operating the steering gear, and may be calculated based on data on the frequency of the steering torque generated according to the driver operating the steering gear.

That is, the high frequency steering torque output from the high pass filter 210 may be a steering torque generated due to an external factor other than the steering torque generated by the driver's operation of the steering gear.

The detection unit according to the first embodiment of the present invention may input the high frequency steering torque output from the high pass filter 210 to the frequency detector 220, so as to detect the first frequency $f_1$ corresponding to the maximum steering torque among the high frequency steering torques.

The frequency detector 220 may include an active notch filter.

For example, when a high frequency steering torque is input to the frequency detector 220, the frequency detector 220 may detect the dominant frequency as the first frequency. The dominant frequency may correspond semantically to a frequency corresponding to a larger energy value among steering torque energies obtained by performing a Fast Fourier Transform (FFT) for the input steering torque.

The calculation unit according to a first embodiment of the present invention may input the high frequency steering torque output from the high pass filter 210 to a change rate calculation unit 230, and calculate the high frequency steering torque change rate, which is the rate of change in the high frequency steering torques.

For example, the change rate calculation unit 230 may calculate the high frequency steering torque change rate by differentiating the input high frequency steering torque (u(t)) with respect to time (dt) and multiplying the same with a constant ($K_1$).

The constant ($K_1$) may be calculated through experimental data or determined by tuning the same through experimentation.

The band frequency output unit according to the first embodiment of the present invention inputs the high frequency steering torque change rate calculated by the change rate calculation unit 230 to the band pass filter 240, so as to output the first frequency band steering torque change rate which is the rate of change in the high frequency steering torques, with respect to the first frequency band, including the first frequency $f_1$ detected by the frequency detector 220.

That is, the band pass filter 240 may include a control terminal to which the frequency is input, and has a pass band configured to include from a frequency obtained by adding a negative margin to the frequency input to the control terminal, to a frequency obtained by adding a positive margin to the first frequency.

In other words, when the high frequency steering torque change rate is input to the band pass filter 240, the first frequency band steering torque change rate, which is the rate of change in the high frequency steering torques with respect to the pass band, can be output.

The compensation unit according to the first embodiment of the present invention may detect rejection gain by inputting the first frequency $f_1$ detected by the frequency detector 220 to a rejection gain map 251.

The rejection gain map 251 is data having a rejection gain for the input frequency, the rejection gain has as a value of "1" when the frequency has a value of being equal to or smaller than the first frequency threshold value, the rejection gain has a value between "1" and "0" and is inversely proportional to the frequency when the frequency has a value exceeding the first frequency threshold value and being equal to or smaller than the second frequency threshold value, and the rejection gain has a value of "0" when the frequency has a value exceeding the second frequency threshold value.

The rejection gain map 251 may be formed into data based on experiments for the necessity of disturbance cancellation, according to the first frequency $f_1$ detected by the frequency detector 220. That is, as a result of experiments on the necessity of disturbance cancellation according to the first frequency $f_1$, the rejection gain may have a value of "0" or "1" according to the degree of disturbance cancellation.

For example, as a result of experiments on the necessity of disturbance cancellation according to the first frequency $f_1$, if the disturbance cancellation is required, the rejection gain may be "1", and as a result of the experiment on the necessity of disturbance cancellation according to the first frequency $f_1$, if the disturbance cancellation is not required, the rejection gain may be "0", and if any disturbance cancellation is required, the rejection gain may be a value between "1" and "0".

The compensation unit according to the first embodiment of the present invention may compensate the assist current of the steering motor by inputting, to the assist current compensator 253, the rejection gain detected by the rejection gain map 251 and the first frequency band steering torque change rate output from the band pass filter 240.

That is, the compensation unit according to the first embodiment of the present invention may compensate the assist current of the steering motor by using a configuration 250 including the rejection gain map 251 and the assist current compensator 253.

According to the steering control apparatus according to the first embodiment of the present invention described above, the steering torque (which corresponds to the disturbance) generated due to external factors, other than the steering torque generated by the steering gear operated by the driver, is cancelled, so as to eliminate the vibration occurring in the steering gear.

Figure 3:
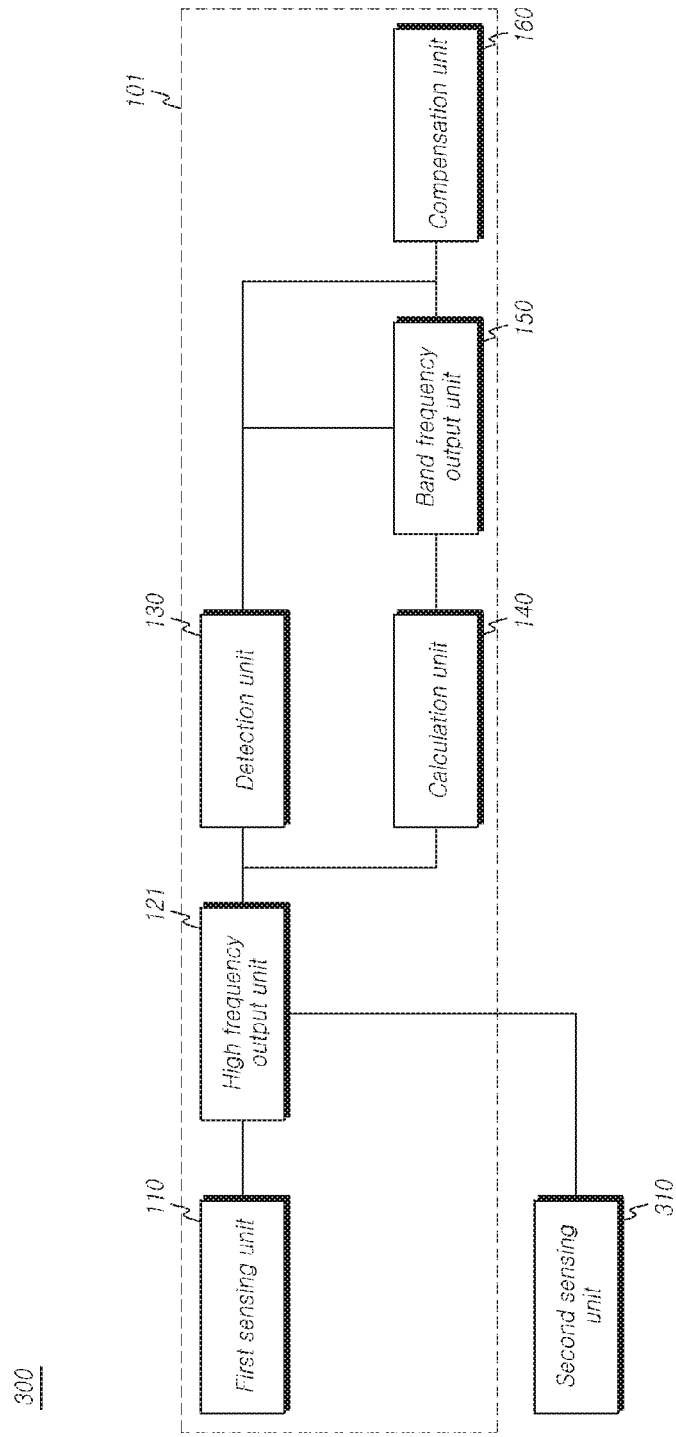
FIG. 3 is a diagram showing a configuration of a steering control apparatus according to a second embodiment of the present invention.

FIG. 3 is a diagram showing a configuration of a steering control apparatus according to a second embodiment of the present invention.

Referring to FIG. 3, a steering control apparatus 300 according to the second embodiment of the present invention may include a steering control device 101 similar to the steering control device shown in FIG. 1, and further include a second sensing unit 310 for detecting a vehicle speed using a vehicle speed sensor.

However, a high frequency output unit 121 may be different in part from the high frequency output unit of the steering control apparatus 100 shown in FIG. 1 in that an operation of the former is determined by receiving an input of a cut-off frequency corresponding to the vehicle speed sensed by the second sensing unit 310.

That is, the operation of the high frequency output unit of the steering control apparatus 100 shown in FIG. 1 may be determined according to a preset cut-off frequency without receiving an input of the cut-off frequency, whereas the operation of the high frequency output unit 121 of the steering control apparatus 101 according to an embodiment of FIG. 3 may be determined according to a cut-off frequency based on a cut-off frequency map according to the vehicle speed which is previously stored, in which the vehicle speed is sensed by the second sensing unit 310.

Generally, as the vehicle speed increases, the frequency of the steering torque sensed by the first sensing unit 110 tends to decrease, so that the cut-off frequency according to the cut-off frequency map may be inversely proportional to the vehicle speed.

That is, the vehicle speed is sensed using the vehicle speed sensor, and the high pass filter may be set to be equal to or higher than a cut-off frequency corresponding to the high frequency steering torque vehicle speed to be output, wherein the cut-off frequency may be inversely proportional to the vehicle speed.

Figure 4:
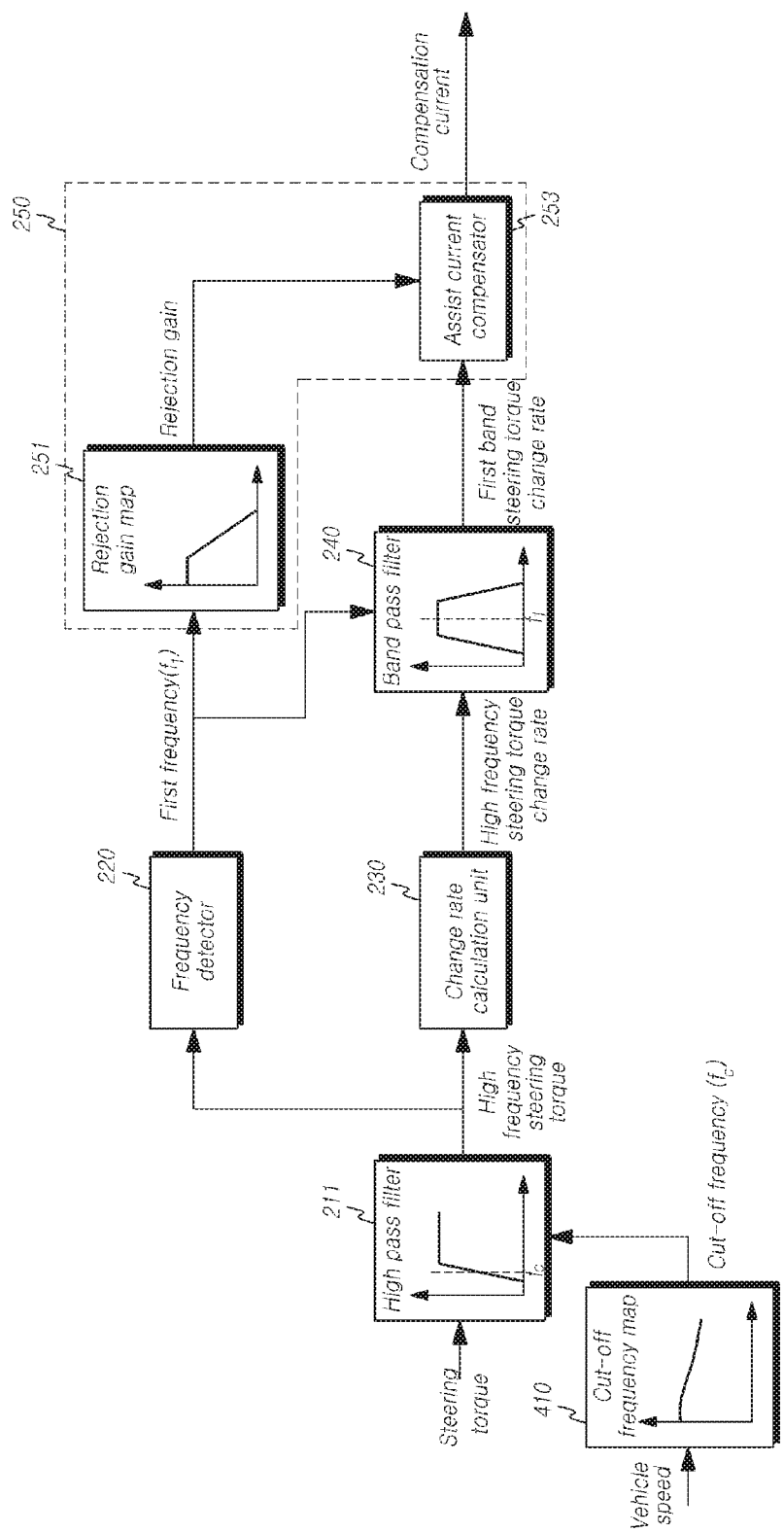
FIG. 4 is a diagram showing an example of describing an operation of a steering control apparatus according to a second embodiment of the present invention.

FIG. 4 is a diagram showing an example of describing an operation of a steering control apparatus according to a second embodiment of the present invention.

Referring to FIG. 4, a high frequency output unit according to the second embodiment of the present invention may input a cut-off frequency $f_C$, which is obtained by inputting the vehicle speed sensed by the second sensing unit to a cut-off frequency map 410, to the control terminal of a high pass filter 211. Accordingly, the high frequency output unit according to the second embodiment of the present invention may adjust the frequency of the high frequency steering torque according to the vehicle speed.

For example, when the vehicle speed is high, the high frequency output unit may output a steering torque for a frequency equal to or higher than a low cut-off frequency, as a high frequency steering torque. On the other hand, when the vehicle speed is low, the high frequency output unit may output a steering torque for a frequency equal to or higher than a high cut-off frequency, as a high frequency steering torque.

The first sensing unit, detection unit, calculation unit, band frequency output unit, and compensation unit, omitting the second sensing unit and high frequency output unit, described with reference to FIGS. 3 and 4 may operate in the same method as the first sensing unit, detection unit, calculation unit, band frequency output unit, and compensation unit of FIGS. 1 and 2.

Figure 5:
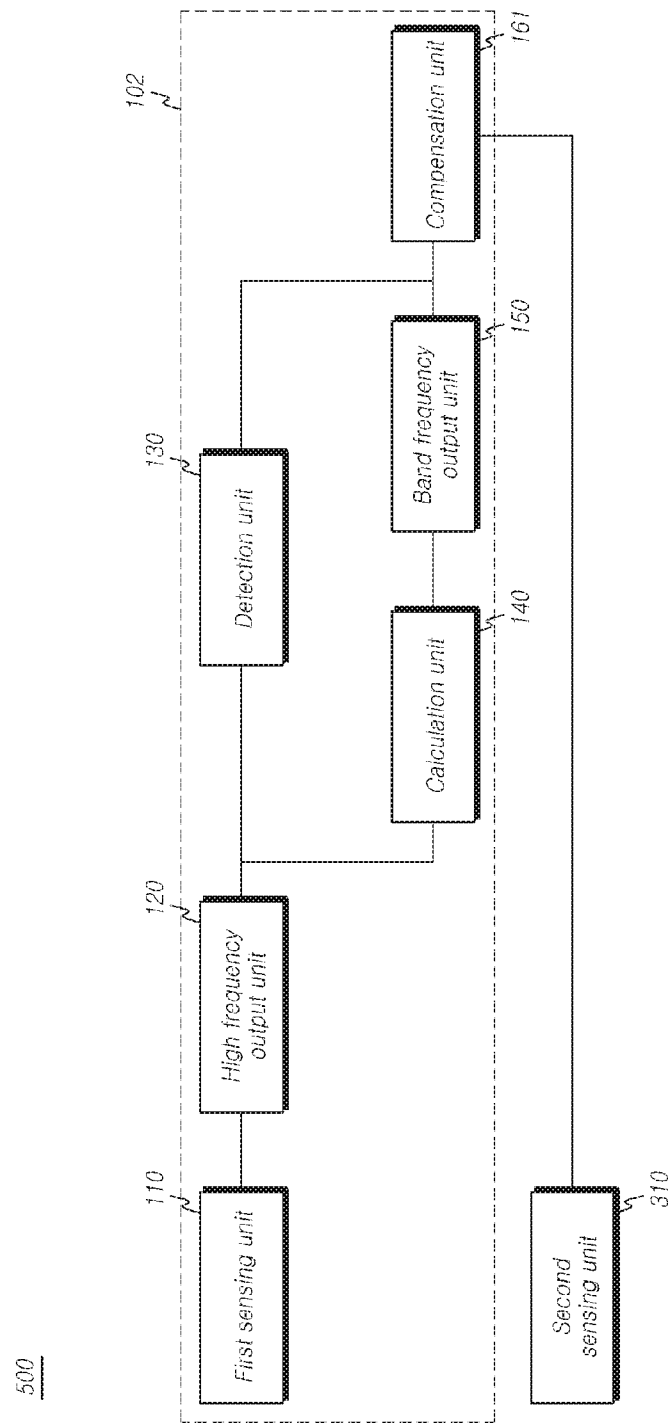
FIG. 5 is a diagram showing a configuration of a steering control apparatus according to a third embodiment of the present invention.

FIG. 5 is a diagram showing a configuration of a steering control apparatus according to a third embodiment of the present invention.

Referring to FIG. 5, a steering control apparatus 500 according to the third embodiment of the present invention may include a steering control device 102 similar to the steering control device shown in FIG. 1, and further include a second sensing unit 310 for detecting a vehicle speed using a vehicle speed sensor.

However, a compensation unit 161 of the steering control device 102 may be different in part from the compensation unit of the steering control apparatus 100 shown in FIG. 1 in that the former compensates an assist current of a steering motor based on a speed gain corresponding to the vehicle speed detected by the second sensing unit 310.

That is, the compensation unit of the steering control device 100 shown in FIG. 1 compensates the assist current of the steering motor based on the rejection gain corresponding to the first frequency detected by the detection unit and the first frequency band steering torque change rate output from the band frequency output unit, while the compensation unit 161 of the steering control device 102 may compensate the assist current of the steering motor by further considering a speed gain based on a speed gain map according to the vehicle speed stored in advance, which is detected by the second sensing unit 310. The speed gain is defined as "0" when the vehicle speed has a value of being equal to or smaller than a first speed threshold value, and may be proportional to the vehicle speed when the vehicle speed has a value exceeding the first speed threshold value.

Generally, since the faster the vehicle speed, the greater the risk of an accident due to the disturbance of the steering torque, the speed gain according to the speed gain map may be proportional to the vehicle speed. That is, as the vehicle's speed increases, the steering control apparatus according to the third embodiment of the present invention may further reduce the disturbance of the steering torque, thereby reducing the risk of an accident.

Figure 6:
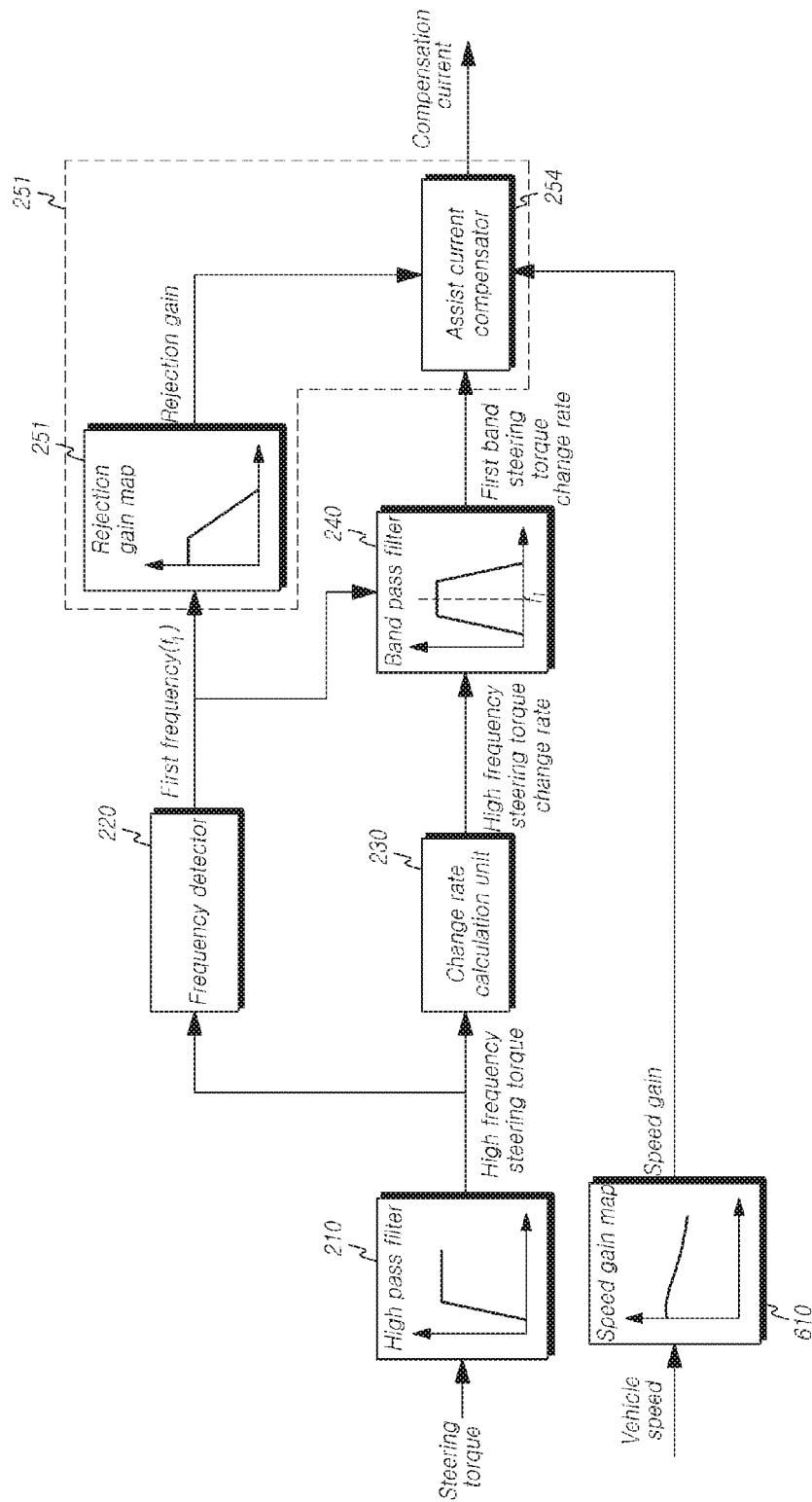
FIG. 6 is a diagram showing an example of describing an operation of a steering control apparatus according to a third embodiment of the present invention.

FIG. 6 is a diagram showing an example of describing an operation of a steering control apparatus according to a third embodiment of the present invention.

Referring to FIG. 6, the compensation unit according to a third embodiment of the present invention may compensate the assist current of the steering motor by further inputting, to an assist current compensator 254, the speed gain obtained by inputting the vehicle speed detected by the second sensing unit to the speed gain map 610. Accordingly, the compensation unit according to the third embodiment of the present invention may adjust the cancellation of the influence of disturbance included in the steering torque, according to the vehicle speed.

For example, when the vehicle speed is high, the compensation unit may compensate the assist current such that the influence of the disturbance included in the steering torque is largely reduced. Alternatively, when the vehicle speed is low, the compensation unit may compensate the assist current such that the influence of the disturbance included in the steering torque is reduced less.

The first sensing unit, high frequency output unit, detection unit, calculation unit, and band frequency output unit, omitting the compensation unit, described with reference to FIGS. 5 and 6 may operate in the same method as the first sensing unit, high frequency output unit, detection unit, calculation unit, and band frequency output unit of FIGS. 1 and 2.

Figure 7:
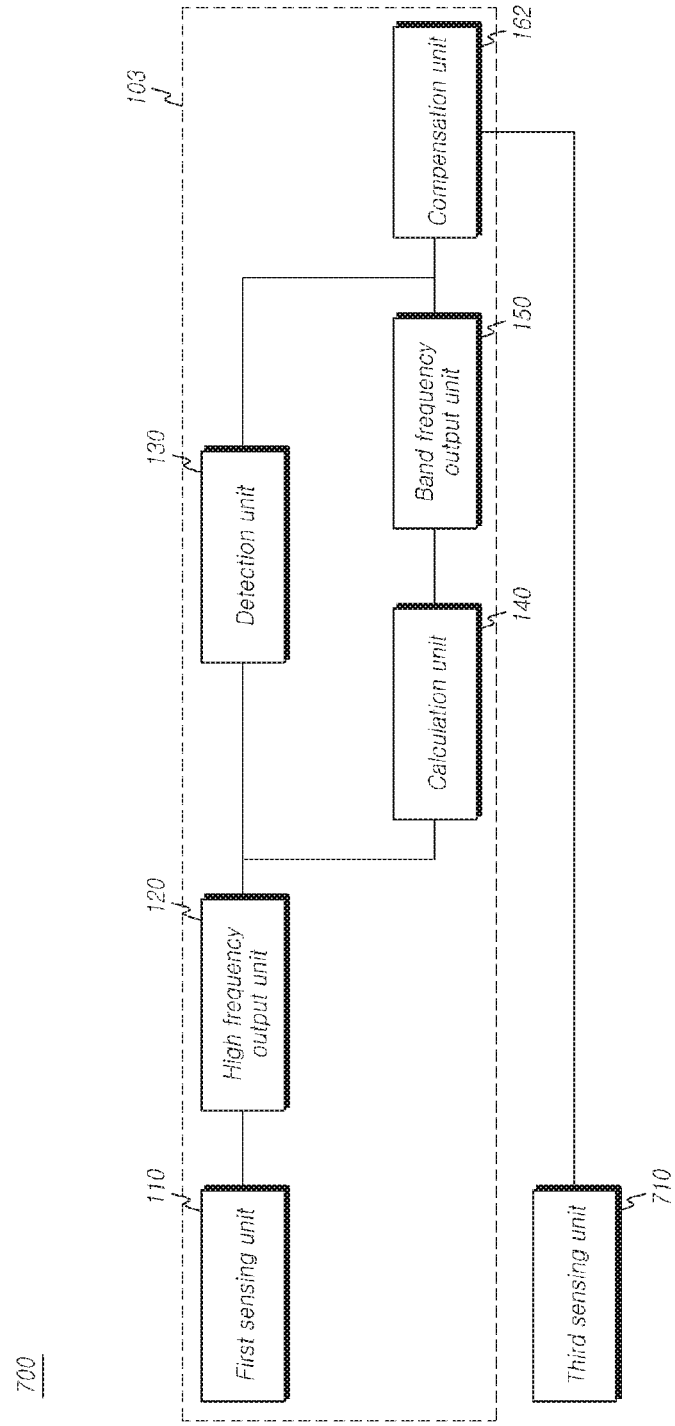
FIG. 7 is a diagram showing a configuration of a steering control apparatus according to a fourth embodiment of the present invention.

FIG. 7 is a diagram showing a configuration of a steering control apparatus according to a fourth embodiment of the present invention.

Referring to FIG. 7, a steering control apparatus 700 according to a fourth embodiment of the present invention may include a steering control device 103 similar to the steering control device shown in FIG. 1, and further include a third sensing unit 710 for detecting a steering angle using an angle sensor.

However, a compensation unit 162 of the steering control device 103 may be different in part from the compensation unit of the steering control apparatus 100 shown in FIG. 1 in that the former compensates the assist current of the steering motor based on an angle gain corresponding to a steering angle detected by the third sensing unit 710.

That is, the compensation unit of the steering control device 100 shown in FIG. 1 compensates the assist current of the steering motor based on the rejection gain corresponding to the first frequency detected by the detection unit and the first frequency band steering torque change rate output by the band frequency output unit, while the compensation unit 162 of the steering control device 103 according to the embodiment of FIG. 7 may compensate the assist current of the steering motor based on an angle gain based on an angle gain map according to the steering angle stored in advance, which is detected by the third sensing unit 710. The angle gain may be defined as a value of "1" when the steering angle has a value of being equal to or smaller than a first angle threshold value, and the angle gain may be inversely proportional to the steering angle when the steering angle has a value exceeding the first angle threshold value and being equal to or smaller than a second angle threshold value, and the angle gain may be defined as a value of "0" when the steering angle has a value exceeding the second angle threshold value.

In general, since it is meaningless to cancel the disturbance included in the steering torque when the steering apparatus operated by the driver generates large steering angle, the angle gain according to each gain map may be inversely proportional to the steering angle. That is, as the steering angle becomes smaller, the steering control apparatus according to the fourth embodiment of the present invention may reduce the disturbance of the steering torque.

Figure 8:
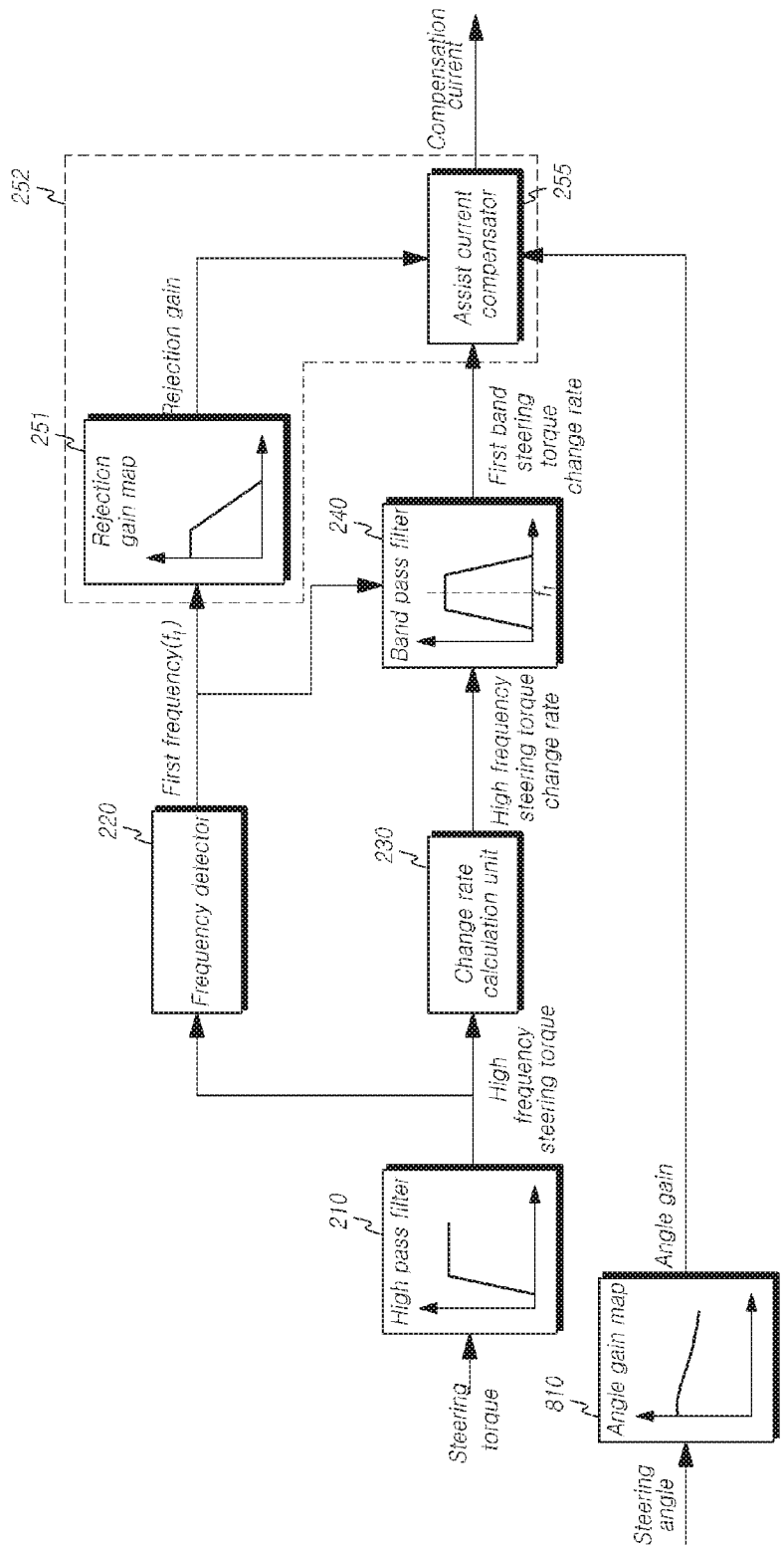
FIG. 8 is a diagram showing an example of describing an operation of a steering control apparatus according to a fourth embodiment of the present invention.

FIG. 8 is a diagram showing an example of describing an operation of a steering control apparatus according to a fourth embodiment of the present invention.

Referring to FIG. 8, the compensation unit according to the fourth embodiment of the present invention may compensate the assist current of the steering motor by further inputting, to an assist current compensator 255, an angle gain obtained by inputting the steering angle detected by the third sensing unit to an angle gain map 810. Accordingly, the compensation unit according to the fourth embodiment of the present invention may adjust the cancellation of influence of disturbances included in the steering torque, according to the steering angle.

For example, when the steering angle is small, the compensation unit may compensate the assist current such that the influence of the disturbance included in the steering torque is largely reduced. Alternatively, when the steering angle is large, the compensation unit may compensate the assist current such that the influence of the disturbance included in the steering torque is reduced less.

The steering control device according to the second embodiment, the steering control device according to the third embodiment, and the steering control device according to the fourth embodiment described above may operate by including one additional configuration as compared with the steering control device according to the first embodiment. However, the steering control device of the present invention is not limited thereto, and may be operated by adding two or more configurations.

That is, the steering control apparatus according to the first embodiment may include a steering control apparatus according to a fifth embodiment, in which one configuration added according to the second embodiment and one configuration added according to the third embodiment are added.

That is, the steering control apparatus according to the fifth embodiment may include the steering control apparatus according to the first embodiment, and further include a second sensing unit that senses the vehicle speed using the vehicle speed sensor, the high pass filter used by the high frequency output unit may output the high frequency steering torque equal to or higher than the cut-off frequency corresponding to the sensed vehicle speed, and the compensation unit may compensate the assist current based on the speed gain corresponding to the sensed vehicle speed.

In addition, the steering control apparatus according to the first embodiment may include a steering control apparatus according to a sixth embodiment, in which one configuration according to the second embodiment and one configuration according to the fourth embodiment are added.

That is, the steering control apparatus according to the sixth embodiment may include the steering control apparatus according to the first embodiment, and further include the second sensing unit that senses the vehicle speed using the vehicle speed sensor and the third sensing unit that senses the steering angle using the angle sensor, the high pass filter used by the high frequency output unit may output the high frequency steering torque equal to or higher than the cut-off frequency corresponding to the sensed vehicle speed, and the compensation unit may compensate the assist current based on the speed gain corresponding to the sensed vehicle speed and an angle gain corresponding to the sensed steering angle.

In addition, the steering control apparatus according to the first embodiment may include a steering control apparatus according to a seventh embodiment, in which one configuration according to the third embodiment and one configuration according to the fourth embodiment are added.

That is, the steering control apparatus according to the seventh embodiment may include the steering control apparatus according to the first embodiment, and further include the second sensing unit that senses the vehicle speed using the vehicle speed sensor and the third sensing unit that senses a steering angle using an angle sensor, and the compensation unit may compensate the assist current based on the speed gain corresponding to the sensed vehicle speed and an angle gain corresponding to the sensed steering angle.

Finally, the steering control apparatus according to the first embodiment may include a steering control apparatus according to an eighth embodiment, in which one configuration according to the second embodiment, one configuration according to the third embodiment, and one configuration according to the fourth embodiment are added.

That is, the steering control apparatus according to the eighth embodiment may include the steering control apparatus according to the first embodiment, and further include a second sensing unit that senses the vehicle speed using the vehicle speed sensor and a third sensing unit that senses the steering angle using the angle sensor, the high pass filter used by the high frequency output unit may output the high frequency steering torque equal to or higher than the cut-off frequency corresponding to the sensed vehicle speed, and the compensation unit may compensate the assist current based on the speed gain corresponding to the sensed vehicle speed and the angle gain corresponding to the sensed steering angle.

Figure 9A:
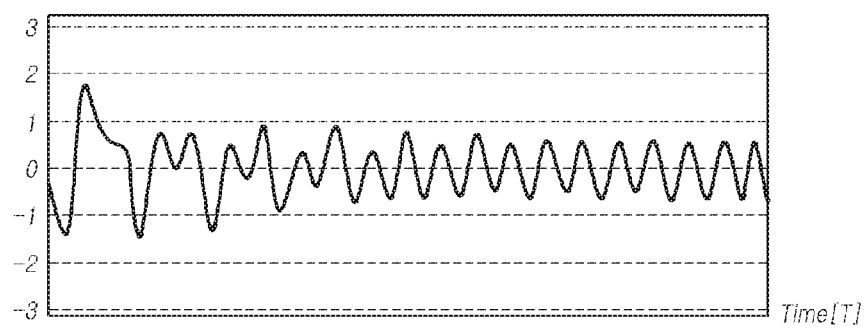
FIGS. 9A and 9B are diagrams showing examples of describing operations of a steering control apparatus according to the present invention.
Figure 9B:
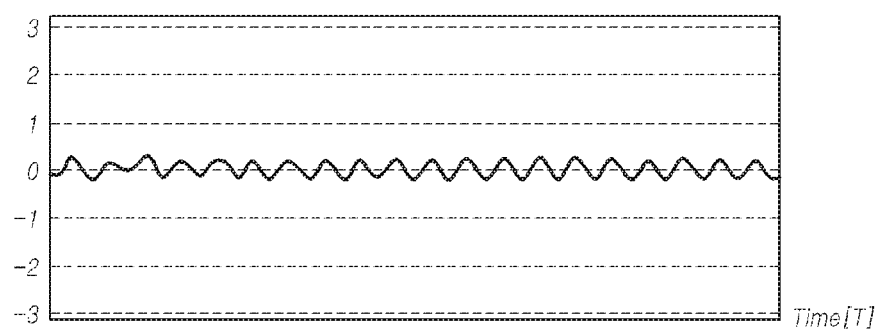

FIGS. 9A and 9B are diagrams showing examples of describing operations of a steering control apparatus of the present invention Referring to FIGS. 9A and 9B, a general steering control apparatus may generate an assist current according to a steering torque including a disturbance, and apply the generated assist current to the steering motor, as shown in FIG. 9A. On the other hand, a steering control apparatus of the present invention may generate an assist current according to a steering torque in which the disturbance is eliminated, and apply the generated assist current to the steering motor, as shown in FIG. 9B.

Accordingly, the assist current generated by the general steering control apparatus may be a triangular wave having a peak value of about 0.9, while the assist current generated by the steering control apparatus of the present invention may be a triangular wave having a peak value of about 0.3.

That is, the steering control apparatus of the present invention may eliminate the vibration occurring in the steering gear by applying, to the steering motor, an assist current that has a smaller variation in the current as compared with a general steering control apparatus.

Hereinafter, a steering control method, which is an operation performed by the steering control apparatus of the present invention, will be described with reference to FIGS. 1 to 9.

Figure 10:
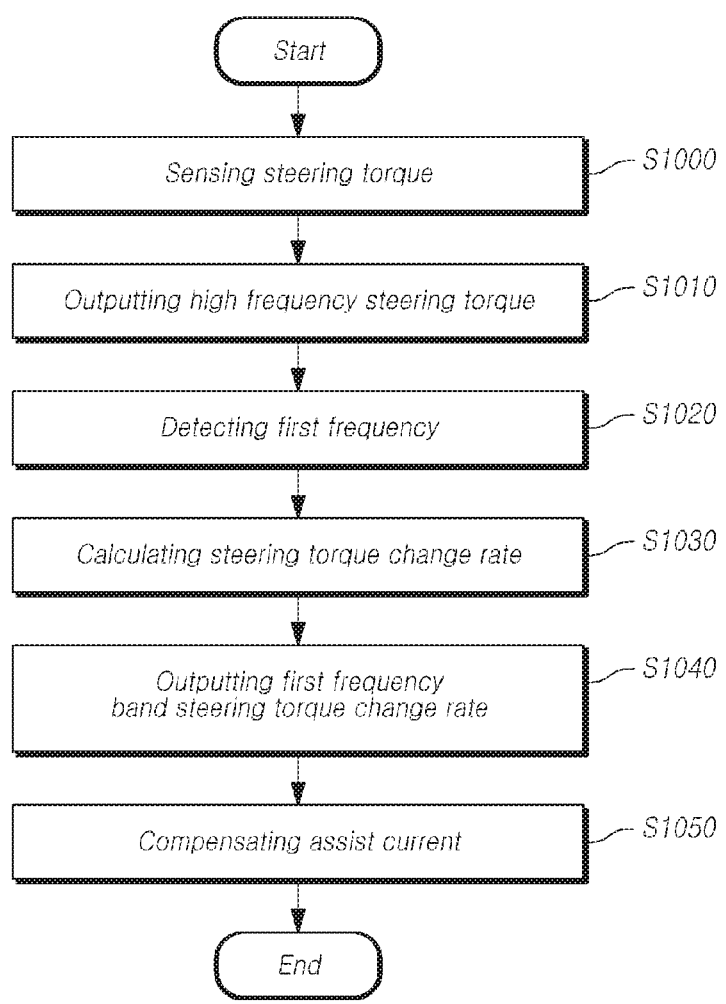
FIG. 10 is a flowchart illustrating a steering control method according to an embodiment of the present invention.

FIG. 10 is a flowchart illustrating a steering control method according to an embodiment of the present invention.

Referring to FIG. 10, the steering control method according to an embodiment of the present invention may include the steps of: sensing a steering torque using a torque sensor (S1000); inputting a steering torque to a high pass filter and outputting high frequency steering torques in which low frequency steering torques are eliminated (S1010); detecting a first frequency corresponding to the maximum steering torque among the high frequency steering torques (S1020); calculating a high frequency steering torque change rate, which is the rate of change in the high frequency steering torques (S1030); inputting the high frequency steering torque change rate to a band pass filter that passes a first frequency band including the first frequency, and outputting a first frequency band steering torque change rate (S1040); and compensating an assist current of a steering motor on the basis of a rejection gain corresponding to the first frequency and the first frequency band steering torque change rate (S1050).

In step S1000 of sensing of the steering torque, the steering torque may be sensed using a torque sensor, but is not limited thereto. That is, in the step S1000 of sensing of the steering torque, a factor other than the steering torque may be sensed by using a sensor other than the torque sensor and the steering torque may be calculated based on a mechanism relationship or a mathematical relationship with the sensed factor.

In step S1010 of outputting the high frequency steering torques, the high frequency steering torques may be output by inputting the steering torque value detected in the step S1000 to the high pass filter which blocks frequency components less than the set cut-off frequency and passes frequency components equal to or higher than the cut-off frequency.

That is, frequency components of the high frequency steering torque may be equal to or higher than the cut-off frequency set in the high pass filter.

The cut-off frequency set in the high pass filter may be a frequency at which the steering torque generated by the driver-operated steering apparatus is blocked, and may be calculated based on data on the frequency of the steering torque generated by the driver's operation of the steering apparatus.

In step S1020 of detecting the first frequency, the first frequency may be detected, which corresponds to the maximum steering torque among high frequency steering torques output in step S1010.

For example, in step S1020 of detecting the first frequency, the first frequency may be detected, by using a frequency detector including an active notch filter, which corresponds to the maximum steering torque among the input high frequency steering torques.

For example, when a high frequency steering torque is input to an active notch filter, the dominant frequency can be output as the first frequency. The dominant frequency may correspond semantically to a frequency corresponding to a larger energy value among steering torque energies obtained by performing a Fast Fourier Transform (FFT) for the input steering torque.

In step S1030 of calculating the steering torque change rate, the high frequency steering torque change rate may be calculated by differentiating the high frequency steering torque output in the step S1010 with respect to time and multiplying the same with a constant.

The constant may be calculated through experimental data or determined by tuning the same through experimentation.

In step S1040 of outputting the first frequency band steering torque change rate, the high frequency steering torque change rate, which is calculated in the step S1030, is input to a band pass filter that passes a first frequency band including the first frequency output in the step S1020, so as to calculate the first frequency band steering torque change rate.

For example, the band pass filter may include a control terminal to which the first frequency is input. The band pass filter may have, as a pass band, a first frequency band including the first frequency input through the control terminal.

More specifically, the first frequency band may be a band which ranges from a frequency obtained by adding a negative margin to the first frequency received through the control terminal to a frequency obtained by adding a positive margin to the first frequency. The positive margin and the negative margin may be previously set.

The first frequency band steering torque change rate may be a steering torque change rate included in the first frequency band which ranges from the frequency obtained by adding a negative margin to the first frequency to the frequency obtained by adding a positive margin to the first frequency.

In step S1050 of compensating the assist current, the assist current of the steering motor may be compensated on the basis of a rejection gain corresponding to the first frequency detected in step S1020 and the first frequency band steering torque change rate output in step S1040.

The rejection gain is a value that determines a disturbance cancellation rate according to a frequency. When a frequency has a value of being equal to or smaller than a first frequency threshold value, the rejection gain may be defined as a value of "1", when a frequency has a value exceeding the first frequency threshold value and being equal to or smaller than the second frequency threshold value, the rejection gain may be inversely proportional to the frequency and defined as a value between "1" and "0", and when the frequency has a value exceeding the second frequency threshold value, the rejection gain may be defined as a value of "0". The first frequency threshold value and the second frequency threshold value may be calculated through experiments.

Accordingly, when the first frequency detected in step S1020 is smaller than or equal to the first frequency threshold value, the rejection gain becomes "1", so that in step S1050, the disturbance can be cancelled, which is included in the steering torque detected in step S1000. On the other hand, when the first frequency detected in step S1020 has a value of being equal to or greater than the first frequency threshold value, the rejection gain becomes "0", so that in step S1050, the disturbance can be maintained, which is included in the steering torque detected in step S1000.

In the above description, the maintaining of the disturbance in step S1050 may mean that the disturbance included in the steering torque detected in step S1000 is small so that the vibration may not occur in the steering operation device, so that the compensation for the disturbance cancellation is not performed, as a result of which, the disturbance may be maintained.

According to the steering control method according to an embodiment of the present invention described above, the steering torque (which corresponds to the disturbance) generated due to external factors other than the steering torque generated by the steering apparatus operated by the driver can be cancelled so as to eliminate vibration occurring in the steering device.

In addition, the steering control method of the present invention may perform all operations performed by the steering control apparatus of the present invention described with reference to FIGS. 1 to 9.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A steering control apparatus comprising:
 a first sensing unit configured to sense a steering torque using a torque sensor;
 a high frequency output unit configured to input a steering torque to a high pass filter and output high frequency steering torques in which low frequency steering torques are eliminated;
 a detection unit configured to detect a first frequency corresponding to a maximum steering torque among high frequency steering torques;
 a calculation unit configured to calculate a high frequency steering torque change rate, which is the rate of change in the high frequency steering torques over time;
 a band frequency output unit configured to input the high frequency steering torque change rate to a band pass filter that passes a first frequency band including the first frequency, so as to output a first frequency band steering torque change rate; and
 a compensation unit configured to compensate an assist current of a steering motor on the basis of a rejection gain corresponding to the first frequency and the first frequency band steering torque change rate,
 wherein when a frequency has a value of being equal to or smaller than a first frequency threshold value, the rejection gain is defined as a value of "1", when a frequency has a value exceeding the first frequency threshold value and being equal to or smaller than the second frequency threshold value, the rejection gain is inversely proportional to the frequency and defined as a value between "1" and "0", and when the frequency exceeds the second frequency threshold value, the rejection gain is defined as a value of "0",
 wherein the steering control apparatus further comprises:
 a second sensing unit configured to sense a vehicle speed using a vehicle speed sensor, wherein the compensation unit compensates the assist current on the basis of the rejection gain, the first frequency band steering torque change rate, and a speed gain corresponding to the vehicle speed, wherein, when the vehicle speed has a value of being equal to or smaller than a first speed threshold value, the speed gain is defined as a value of "0", and when the vehicle speed has a value exceeding the first speed threshold value, the speed gain is defined as being proportional to the vehicle speed, and wherein the steering control apparatus further comprises:

a third sensing unit configured to sense a steering angle using an angle sensor, wherein the compensation unit compensates the assist current on the basis of the rejection gain, the first frequency band steering torque change rate, and an angle gain corresponding to the steering angle, wherein, when the steering angle has a value of being equal to or smaller than a first angle threshold value, the angle gain is defined as a value of "1", when the steering angle has a value exceeding the first angle threshold value and being equal to or smaller than a second angle threshold value, the angle gain is inversely proportional to the frequency and defined as a value between "1" and "0", and when the steering angle has a value exceeding the second angle threshold value, the angle gain is defined as a value of "0".

2. The steering control apparatus of claim 1, further comprising:

a second sensing unit configured to sense a vehicle speed using a vehicle speed sensor, wherein the high pass filter outputs the high frequency steering torques equal to or higher than a cut-off frequency corresponding to the vehicle speed.

3. The steering control apparatus of claim 2, wherein the cut-off frequency is inversely proportional to the vehicle speed.

4. The steering control apparatus of claim 1, further comprising:

a second sensing unit configured to sense a vehicle speed using a vehicle speed sensor, wherein the high pass filter outputs the high frequency steering torques equal to or higher than a cut-off frequency corresponding to the vehicle speed, and the compensation unit compensates the assist current on the basis of the rejection gain, the first frequency band steering torque change rate, and a speed gain corresponding to the vehicle speed.

5. The steering control apparatus of claim 1, further comprising:

a second sensing unit configured to sense a vehicle speed using a vehicle speed sensor and a third sensing unit configured to sense a steering angle using an angle sensor, wherein the compensation unit compensates the assist current on the basis of the rejection gain, the first frequency band steering torque change rate, a speed gain corresponding to the vehicle speed, and an angle gain corresponding to the steering angle.

6. The steering control apparatus of claim 5, wherein the high pass filter outputs the high frequency steering torque equal to or higher than a cut-off frequency corresponding to the vehicle speed.

7. A steering control method comprising:

sensing a steering torque using a torque sensor;

inputting the steering torque to a high pass filter and outputting high frequency steering torques in which low frequency steering torques are eliminated;

detecting a first frequency corresponding to a maximum steering torque among the high frequency steering torques;

calculating a high frequency steering torque change rate, which is the rate of change in the high frequency steering torques over time;

inputting the high frequency steering torque change rate to a band pass filter that passes a first frequency band including the first frequency, so as to output a first frequency band steering torque change rate; and compensating an assist current of a steering motor on the basis of a rejection gain corresponding to the first frequency and the first frequency band steering torque change rate, wherein when a frequency has a value of being equal to or smaller than a first frequency threshold value, the rejection gain is defined as a value of "1", when a frequency has a value exceeding the first frequency threshold value and being equal to or smaller than the second frequency threshold value, the rejection gain is inversely proportional to the frequency and defined as a value between "1" and "0", and when the frequency exceeds the second frequency threshold value, the rejection gain is defined as a value of "0", wherein the steering control method further comprises:

sensing, by a second sensing unit, a vehicle speed using a vehicle speed sensor, wherein the compensation unit compensates the assist current on the basis of the rejection gain, the first frequency band steering torque change rate, and a speed gain corresponding to the vehicle speed, wherein, when the vehicle speed has a value of being equal to or smaller than a first speed threshold value, the speed gain is defined as a value of "0", and when the vehicle speed has a value exceeding the first speed threshold value, the speed gain is defined as being proportional to the vehicle speed, and wherein the steering control method further comprises:

sensing, by a third sensing unit, a steering angle using an angle sensor, wherein compensating of the assist current comprises compensating the assist current on the basis of the rejection gain, the first frequency band steering torque change rate, and an angle gain corresponding to the steering angle, wherein, when the steering angle has a value of being equal to or smaller than a first angle threshold value, the angle gain is defined as a value of "1", when the steering angle has a value exceeding the first angle threshold value and being equal to or smaller than a second angle threshold value, the angle gain is inversely proportional to the frequency and defined as a value between "1" and "0", and when the steering angle has a value exceeding the second angle threshold value, the angle gain is defined as a value of "0".

8. The steering control method of claim 7, wherein outputting of the high frequency steering torques comprises: outputting of the high frequency steering torques equal to or higher than a cut-off frequency corresponding to a vehicle speed.

9. The steering control method of claim 8, wherein the cut-off frequency is inversely proportional to the vehicle speed.

* * * * *